(12) United States Patent
Kim et al.

(10) Patent No.: US 9,747,666 B2
(45) Date of Patent: Aug. 29, 2017

(54) APPARATUS AND METHOD OF REPRODUCING MULTI IMAGE

(71) Applicant: SAMSUNG ELECTRONICS CO., LTD., Suwon-si, Gyeonggi-do (KR)

(72) Inventors: Yun-su Kim, Suwon-si (KR); Sang-jun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 391 days.

(21) Appl. No.: 14/462,744

(22) Filed: Aug. 19, 2014

(65) Prior Publication Data

US 2015/0138242 A1    May 21, 2015

(30) Foreign Application Priority Data

Nov. 21, 2013  (KR) ........................ 10-2013-0142043

(51) Int. Cl.
   *G06T 3/40* (2006.01)

(52) U.S. Cl.
   CPC ........ *G06T 3/4038* (2013.01); *G06T 2200/32* (2013.01)

(58) Field of Classification Search
   None
   See application file for complete search history.

(56) References Cited

U.S. PATENT DOCUMENTS

| 2001/0024235 A1* | 9/2001 | Kinjo | H04N 1/32101 348/231.99 |
| 2010/0039447 A1* | 2/2010 | Nakao | H04N 1/387 345/634 |
| 2012/0236027 A1* | 9/2012 | Ogata | G06F 3/04883 345/629 |

FOREIGN PATENT DOCUMENTS

KR   10-1058042   8/2011

* cited by examiner

*Primary Examiner* — Michelle Chin
(74) *Attorney, Agent, or Firm* — Staas & Halsey LLP

(57) ABSTRACT

Disclosed are a multi image reproducing apparatus and a multi image reproducing method. The multi image reproducing apparatus includes an image processor to process image data corresponding to a plurality of image contents and to output the image data by or in correspondence to the image contents, an image composition and output part or outputer to compose image frames of the image data input from the image processor and to output a composed mosaic split image frame, and a controller to receive operation information on the image composition and output part from the image composition and output part, to calculate optimal input time information of the image frames input from the image processor to the image composition and output part based on the received operation information, and to provide the calculated optimal input time information to the image processor.

18 Claims, 6 Drawing Sheets

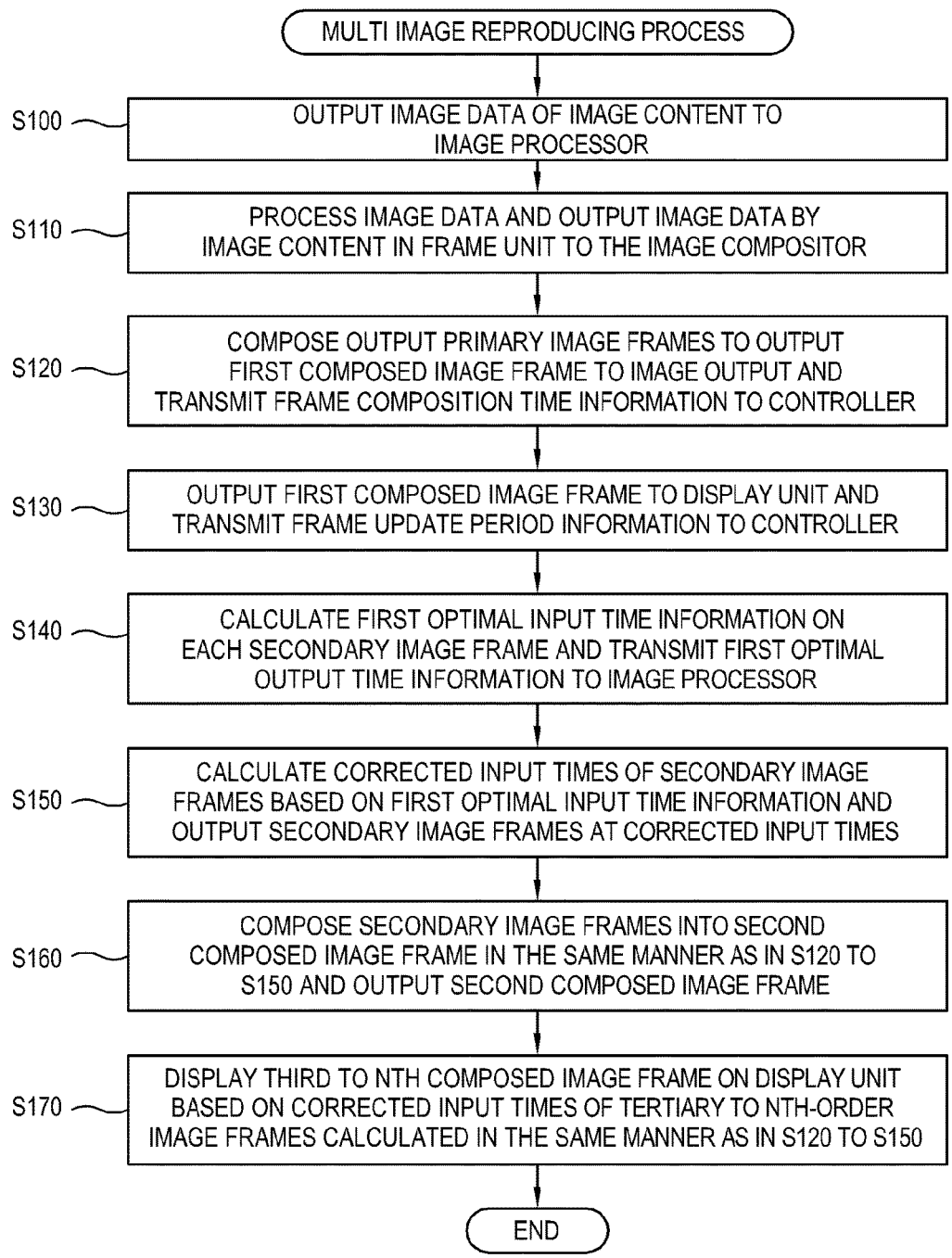

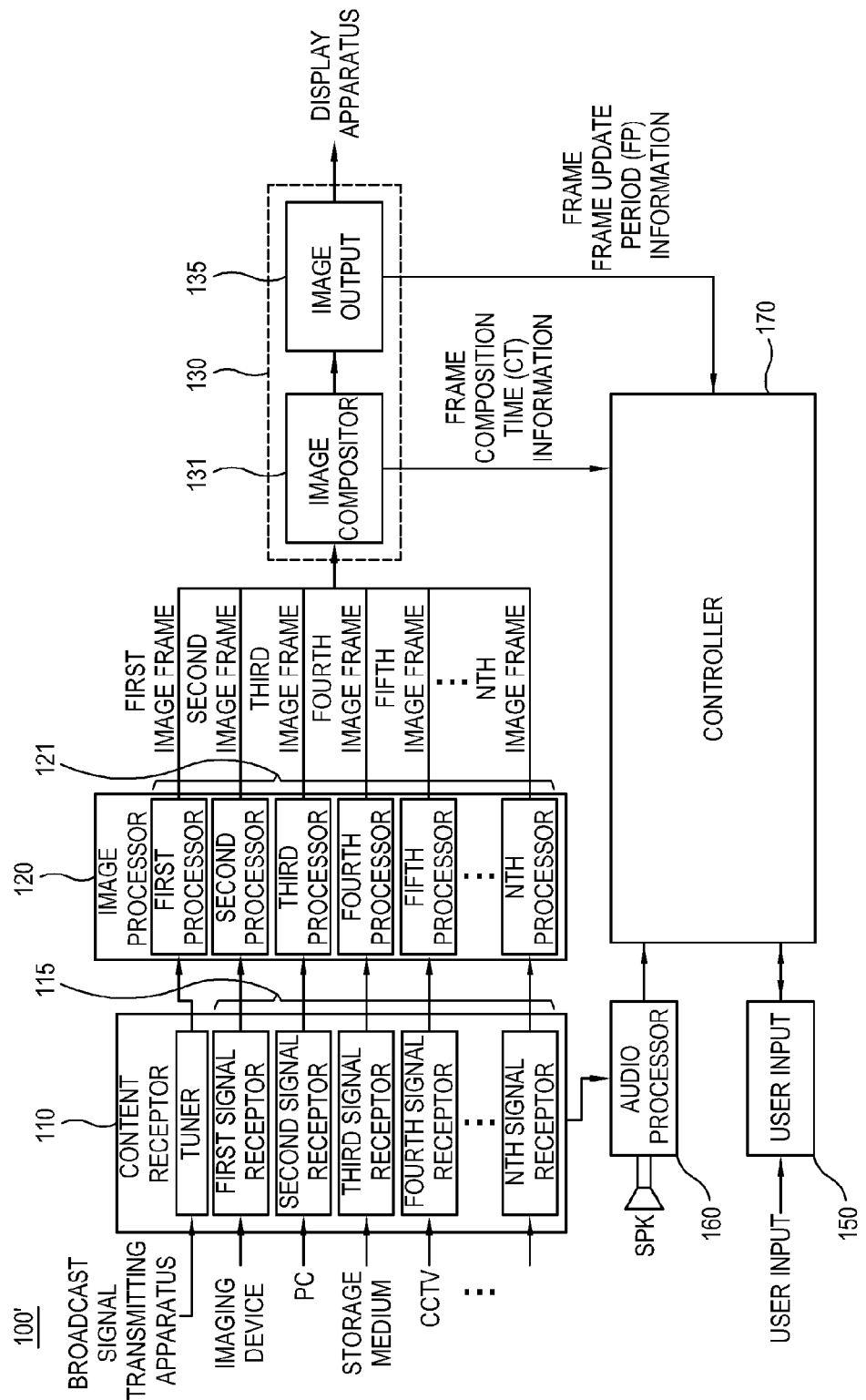

APPARATUS AND METHOD OF REPRODUCING MULTI IMAGE

CROSS-REFERENCE TO RELATED APPLICATIONS

This application claims priority from Korean Patent Application No. 10-2013-0142043, filed on Nov. 21, 2013 in the Korean Intellectual Property Office, the disclosure of which is incorporated herein by reference.

BACKGROUND

1. Field

Apparatuses and methods consistent with the exemplary embodiments relate to an apparatus and a method of reproducing a multi image or mosaic, more particularly to a multi image reproducing apparatus and method, which are capable of reproducing each image content in accordance with its proper or natural frame update period, for example, at its frame rate, when simultaneously reproducing a plurality of image contents or images.

2. Description of the Related Art

Generally, an apparatus for reproducing a multi image (hereinafter, also referred to as "multi image reproducing apparatus") is a device that simultaneously reproduces a plurality of image contents to display a multi image or mosaic on a screen of a display apparatus, such as a TV, and is used to monitor a plurality of image contents input from a plurality of external image sources in various fields, such as security, traffic, broadcasting, etc.

The multi image reproducing apparatus typically includes a content receptor, an image processor and an image composition and output part. The content receptor separates image data from each of a plurality of image contents input from a plurality of external image sources. The image processor processes the image data input from the content receptor to output the data by frames. The image composition and output part composes image frames input from the image processor and transmits the composed image frames to the display apparatus to be displayed as a multi image on a screen of a display apparatus.

However, in this conventional multi image reproducing apparatus, the image processor calculates output timings of the image frames for each content only in view of a frame rate of each image content without considering an image frame composition time and/or a frame update period of the image composition and output part and outputs the image frames to the image composition and output part at the calculated output timings.

As a result, the image frames output from the image processor to the image composition and output part are delayed for the image frame composition time of the image composition and output part based on output timing of a finally output image frame according to the frame rate of each image content, and then output to the display apparatus.

For instance, the frame rate ranges variously from 10 to 60 frames per second (FPS) depending on image content. Further, the frame update period FP of the image composition and output part is fixed to 3.3 to 40 milliseconds (ms) depending on performance of the multi image reproducing apparatus. Thus, as shown in FIG. 1, image frames input from the image processor to the image composition and output part between a first update time $RPTi$ and a second update time $RPTj$ in the frame update period FP of the image composition and output part are input at different input times $IT1, IT2, \ldots, ITN$ according to the frame rate of corresponding image contents. Accordingly, the image composition and output part starts composing the input frames after all image frames are input, composes the image frames for a predetermine image frame composition time $CTi$ according to the image frames being composed, and outputs the composed frame to the display apparatus.

Here, if a time period $ITN\_RPTj$ from an input time ITN of the last image frame to the second frame update time $RPTj$ of the image composition and output part is shorter than the image frame composition time $CTi$ of the image composition and output part, an output time $FPi$ of a composed image frame by the image composition and output part is a third update time $RPTk$, delayed by one period from the second update time $RPTj$ as an ideal output time. Thus, the composed image frame is output at the third update time $RPTk$ by the image composition and output part, skipping one frame update period, and displayed on the display apparatus for the output time $FPi$ of the frame update period FP.

Here, an image frame of image data corresponding to image content input in a period $P\_RPTj$ ($P<P\_RPTj<RPTj$) between a point P and the second update time $RPTj$ among the plurality of image contents is delayed and output by the image frame composition time $CTi$ at the image composition and output part, the point P being distant by the image frame composition time CT of the image composition and output part from the second update time $RPTj$ towards the first update time $RPTi$. Thus, the image frame is output not at the second update time $RPTj$ as the ideal output time but at the third update time $RPTk$ along with the composed image frame, skipping one period update period, and is displayed on the display apparatus. If image frames exhibiting such a phenomenon frequently happen in one image content, an area on the screen of the display apparatus corresponding to the one image content provides discontinuous images to users instead of smooth images, resulting in deterioration in overall quality of images displayed on the screen of the display apparatus.

SUMMARY

Additional aspects and/or advantages will be set forth in part in the description which follows and, in part, will be apparent from the description, or may be learned by practice of the embodiments.

An aspect of one or more exemplary embodiments is to provide a multi image reproducing apparatus and a multi image reproducing method which are capable of reproducing each image content in accordance with its proper frame update period, for example, its frame rate, when simultaneously reproducing a plurality of image contents.

The foregoing and/or other aspects may be achieved by providing a multi image reproducing apparatus including: an image processor to process image data corresponding to a plurality of image contents and to output the image data by image contents; an image composition and output part to compose image frames of the image data input from the image processor and to output a composed image frame; and a controller to receive operation information on the image composition and output part from the image composition and output part, to calculate optimal input or transfer time information of the image frames input from the image processor to the image composition and output part based on the received operation information, and to provide the calculated optimal input time information to the image processor.

The image composition and output part may include an image compositor to compose the image frames input from the image processor into one image frame, and an image output to output the one image frame composed by the image compositor in a predetermined frame update period.

The operation information may include at least one of first information about an operation of the image compositor provided by the image compositor and second information about an operation of the image output provided by the image output. At this time, the first information may include information about a frame composition time taken to compose the image frames by the image compositor. Also, the second information may include information about a frame update period of the image output or information about an output time of the composed image frame.

The optimal output time information of the image frames may include input timing values to input the image frames from the image processor to the image compositor so that the composed image frame of the image frames is output at an update time right after an interval of the frame update period in which composition starts. Here, when a sum of a time value of normal input time of the image frames to the image compositor and a frame composition time exceeds a time value of the update time, the input timing values are calculated as a negative value of the exceeded time value.

The image processor may calculate corrected input times of the respective image frames based on the optimal input time information of the image frames input from the image processor to the image composition and output part, provided from the controller, and input the respective image frames according to the corrected input times.

Another aspect may be achieved by providing a multi image reproducing method including: outputting image data corresponding to a plurality of image contents by image contents; composing image frames of the image data input by the outputting to output a composed image frame; and controlling the outputting based on an operation information on the composing.

The composing may include composing the input image frames into one image frame, and outputting the composed image frame in a predetermined frame update period.

The operation information may include at least one of first information about an operation of composing the image frames and second information about an operation of outputting the composed image frame. Here, the first information may include information about a frame composition time taken to compose the image frames. Also, the second information may include information about a frame update period or information about an output time of the composed image frame.

The controlling may include calculating optimal input time information of the image frames so as to compose the image frames based on the operation information about the composing, calculating respective corrected input times of the image frames based on the calculated optimal input time information of the image frames, and inputting the respective image frames to compose the image frames based on the respective corrected input times of the image frames.

The calculating the optimal input time information of the image frames may further include calculating input timing values to input the image frames so that the composed image frame of the image frames is output at an update time right after an interval of the frame update period in which composition starts. When a sum of a time value of normal input time of the image frames and a frame composition time exceeds a time value of the update time, the input timing values are calculated as a negative value of the exceeded time value.

Another aspect may be achieved by providing a method of processing plural images including calculating a transfer time to a compositor of each image of the plural images where the compositor composes the plural images into a mosaic image and where the transfer time is based on a plural image processing and mosaic composition time and controlling a transfer of each image to the compositor based on the transfer time.

The transfer time may be based on a frame update period for each image source to process each image within the frame update period and prevent update period skipping.

The method may include continuously updating the transfer time responsive to a time it takes to process the plural images and the mosaic image to process each image within the frame update period and prevent update period skipping for images of different complexity.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 4 is a flowchart illustrating an operation of the multi image reproducing apparatus according to the exemplary embodiment.

FIG. 5 is a block diagram illustrating a multi image reproducing apparatus according to another exemplary embodiment.

DETAILED DESCRIPTION

Figure 1:
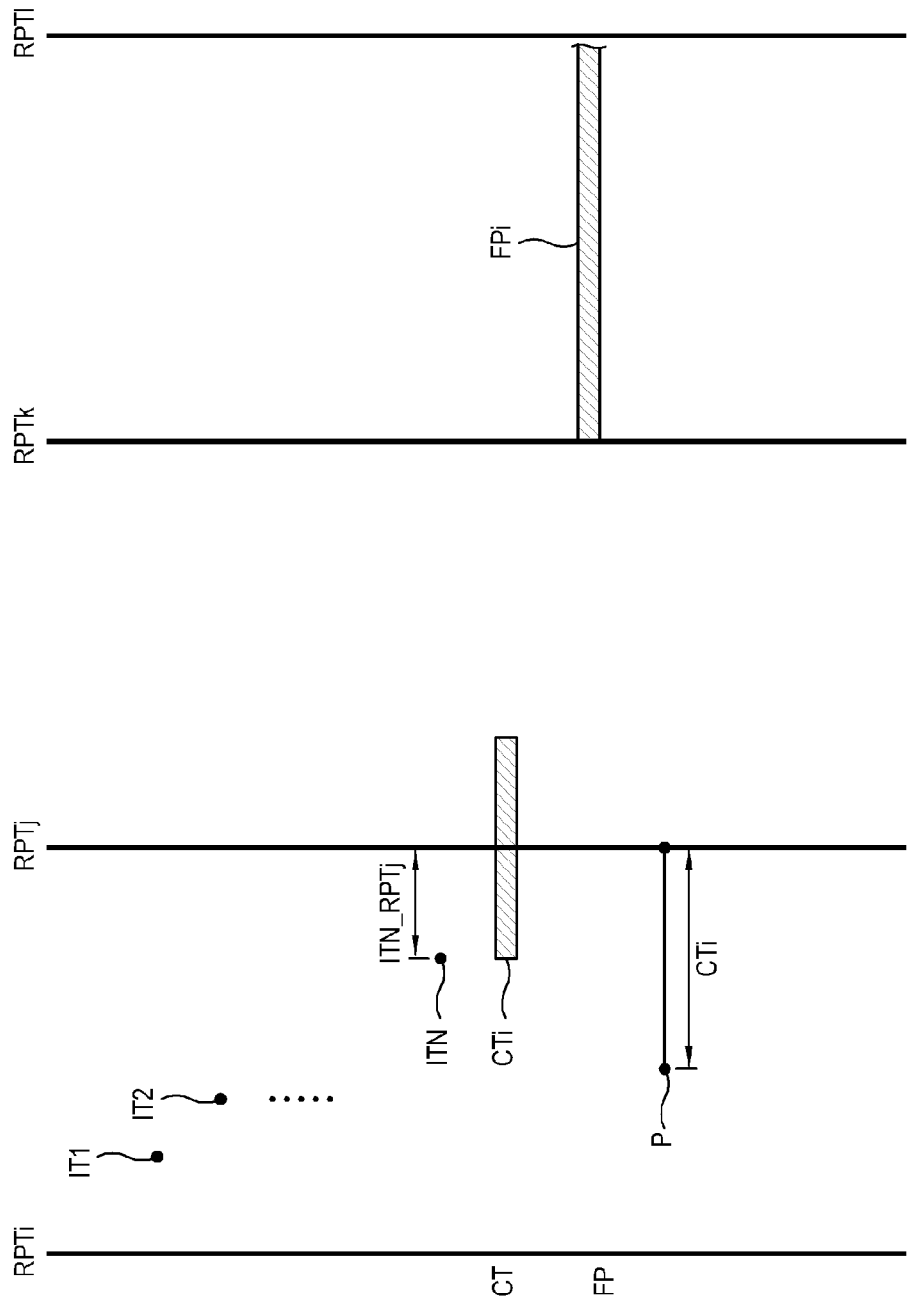
FIG. 1 illustrates input and output timings of image frames and a composed image frame of a conventional multi image reproducing apparatus.

Reference will now be made in detail to the embodiments, examples of which are illustrated in the accompanying drawings, wherein like reference numerals refer to the like elements throughout. The embodiments are described below to explain the embodiments by referring to the figures.

Below, an apparatus and a method of reproducing a multi image according to exemplary embodiments will be described in detail with reference to the accompanying drawings.

Figure 2:
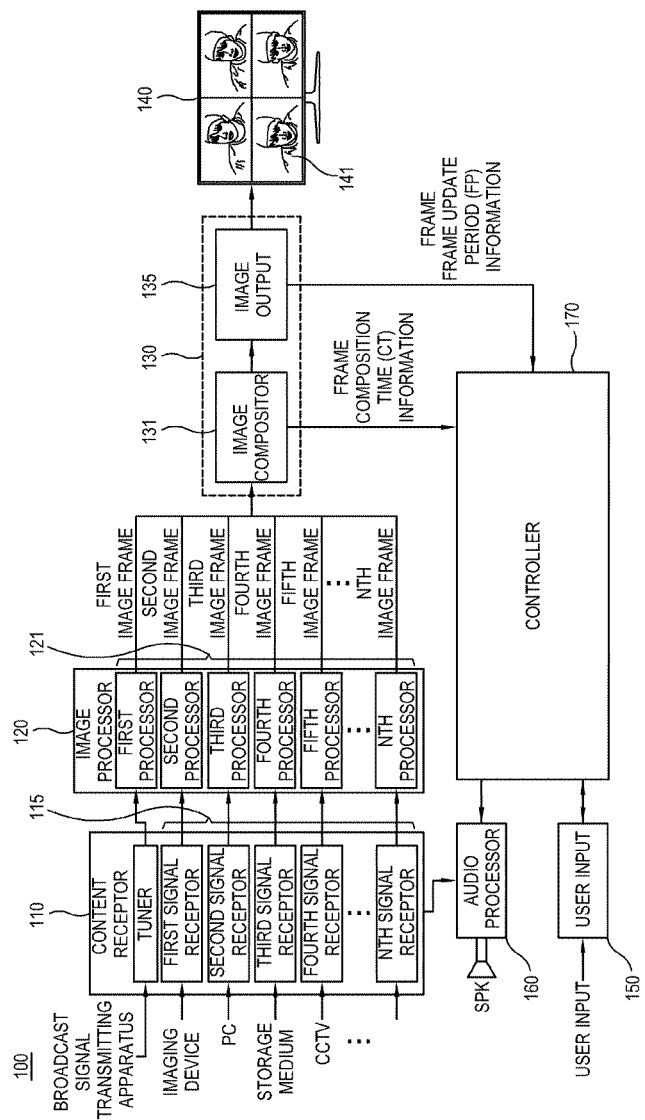
FIG. 2 is a block diagram illustrating a multi image reproducing apparatus according to an exemplary embodiment.

FIG. 2 is a block diagram illustrating a configuration of an apparatus for reproducing a mosaic or a multi image (hereinafter, also referred to as a multi image reproducing apparatus) 100 according to an exemplary embodiment.

The multi image reproducing apparatus 100 according to the present embodiment is a device that simultaneously reproduces a plurality of image contents to display the plurality of image contents as a multi image in split areas as a mosaic on a screen of a display.

The multi image reproducing apparatus 100 includes a content receptor 110, an image processor 120, an image composition and output part 130, a display unit 140, a user input 150, an audio processor 160 and a controller 170.

The content receptor 110 separates each of a plurality of image contents input from a plurality of external image sources into image data and audio data. Here, the external image sources may include a broadcast signal transmitting apparatus that transmits a broadcast signal, an imaging device that reproduces image contents, such as a DVD player and a BD player, a PC connected to a network such as the Internet, a storage medium to store image contents such as a USB storage medium, a closed-circuit television (CCTV) to take images, etc.

The content receptor 110 may be configured to include a tuner 111, a plurality of signal receptors 115, or/and a combination thereof.

The tuner 111 is connected to the broadcast signal transmitting apparatus via a cable or wirelessly and separates a broadcast signal received from the broadcast signal transmitting apparatus into image data and audio data according to each broadcast channel.

The signal receptors 115 are connected to the external image sources, such as the imaging device, the PC, the storage medium, the CCTV and the like, respectively, and separate image content signals input from the external image sources into image data and audio data.

In the following description, it is assumed that the content reception 110 is configured to include the plurality of signal receptors 115.

The image processor 120 includes a plurality of processors 121 to process image data corresponding to the respective image contents of the external image sources input from the plurality of signal receptors 115. The processors 121 conducts processing, for example, decoding, image enhancing, and/or scaling, on the image data corresponding to the image contents of the external image sources and outputs the processed image data to the image composition and output part 130 by image content. Here, since the image contents generally have a frame rate ranging from 25 to 300 frames per second (FPS), for example, 25, 30, 60, 120 or 300 fps, the processed image data is output by frame units according to the frame rate of the corresponding image contents.

Further, the image processor 120 may calculate an optimal input or transfer time information for quickest output of image frames input to the image composition and output part or outputer 130 to the display unit 140, by image content, by using operation information on the image composition and output part or outputer 130 provided by the controller 170, and input the image frames to the image composition and output part or outputer 130 based on the calculated optimal input time information by image content, as will be described.

The image composition and output part or outputer 130 composes and outputs the image frames for the respective image contents input from the image processor 120. To this end, the image composition and output part 130 includes an image compositor 131 and an image output 135.

The image compositor 131 composes the image frames input from the image processor 120 into one image frame. Here, as shown in FIG. 2, the composed image frame is formed such that the input image frames are displayed in a plurality split areas 141 forming a multi image or mosaic image on the screen of the display unit 140.

The image compositor 131 transmits operation information on an operation of the image compositor 131 to the controller 170. The operation information may include a frame composition time CT that changes according to a frame rate of image frames input to the image compositor 131. The image output 135 outputs the composed image frame to the display unit 140 in a predetermined frame update period FP. The frame update period FP, which is a time interval in which a composed one image frame or mosaic is output, is determined based on performance of the multi image reproducing apparatus 100. The frame update period FP may be set to range from 3.3 to 40 ms based on a frame rate ranging from 25 to 300 FPS, for example, to 40, 33.3, 16.6, 8.3 or 3.3 ms based on a frame rate of 25, 30, 60, 120 or 300 FPS. In the following description, it is assumed that the frame update period FP is set to 33.3 ms based on a frame rate of 30 FPS used for a DVD, a home camcorder and broadcast signals.

The image output 135 transmits operation information on an operation of the image output 135 to the controller 170. The operation information may include the frame update period FP of the image output 135 or information on a time to output the composed image frame, for example, time values to output first and second composed image frames, that is, values of second and third update times RPT2 and RPT3, which will be described with reference to FIG. 3A.

The display unit 140 displays an image on the screen based on the composed image frame output from the image output 135. The display unit 140 may be provided as a flat display panel, such as a liquid crystal display (LCD), an organic light emitting diode (OLED) and an active matrix organic light emitting diode (AMOLED), which are included in an integrated manner in the multi image reproducing apparatus 100.

Alternatively, as in a multi image reproducing apparatus 100' shown in FIG. 5, the display unit may be configured as a separate display apparatus, such as a monitor and a TV, instead of being included in the multi image reproducing apparatus 100.

The user input 150 (FIG. 2) receives a user instruction. The user input 150 may be configured to include, for example, a remote controller (not shown) and a remote control signal receptor (not shown) to receive a remote control signal including key input information corresponding to a user input from the remote controller.

The audio processor 160 processes audio data corresponding to each image content of the external image sources input from the signal receptors 110 and outputs the audio data to a speaker SPK under a control of the controller 170. Here, the audio processor 160 may process only audio data corresponding to image content selected based on a user input through the user input 150 among audio data corresponding to the image contents and output the audio data to the speaker SPK.

The controller 170 controls general functions of the multi image reproducing apparatus 100. Particularly, the controller 170 controls the functions of the multi image reproducing apparatus 100 according to a remote control signal including key input information corresponding to a user input received through the user input 150.

Further, the controller 170 receives the operation information, for example, the frame composition time CT of the image compositor 131 and the frame update period FP or the output time of the composed image frame, from the image compositor 131 and the image output 135 of the image composition and output part 130, calculates optimal input time information on each image frame to be input from the image processor 120 to the image compositor 131 based on the received operation information, and provides the calculated optimal input time information to the image processor 120.

In detail, suppose that the image processing apparatus 120 includes first to third processors 121 to process image data corresponding to first to third image contents of first to third external image sources, the first to third processors 121 output image data at corresponding frame rates 25 FPS, 30 FPS and 60 FPS, respectively, the image compositor 131 has a frame composition time CT of 27.7 ms, and the image output 135 has a frame update period FP of 33.3 ms.

Figure 3A:
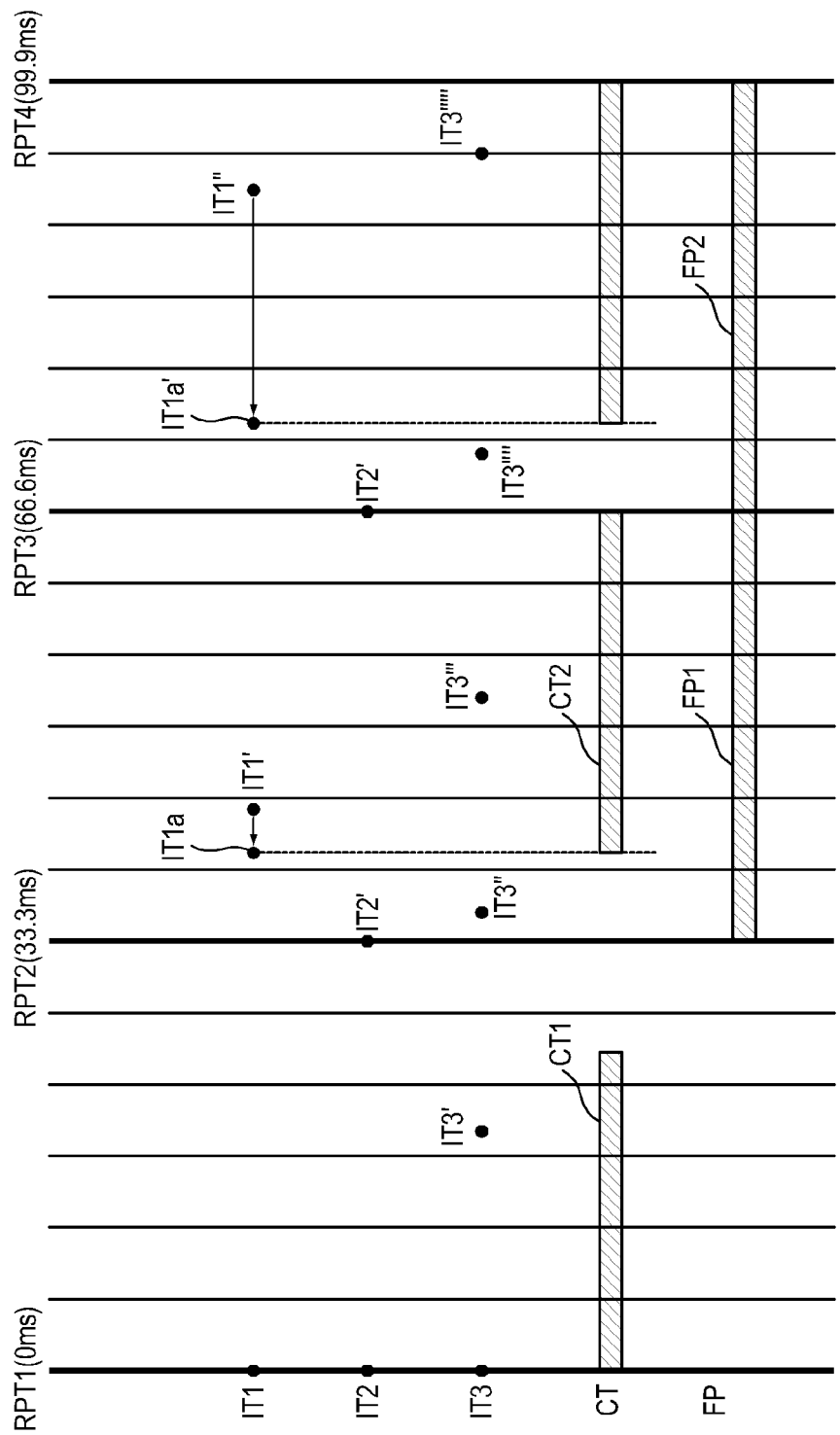
FIG. 3A illustrates input and output timings of image frames and a composed image frame of the multi image reproducing apparatus according to the exemplary embodiment.

In this condition, as shown in FIG. 3A, when first to third primary image frames of first image data corresponding to the first to third image contents are respectively input from the first to third processors 121 to the image compositor 131 at first to third primary input times IT1, IT2 and IT3 corresponding to a first update time RPT1 of 0 ms in the frame update period FP after the multi image reproducing apparatus 100 starts operating, the image compositor 131 composes the first to third primary image frames into one first composed image frame for a first frame composition time CT1 of 27.7 ms and outputs the first composed image frame to the image output 135. Here, the image compositor 131 transmits the first frame composition time CT1 of 27.7 ms taken to compose the first to third primary image frames to the controller 170 as operation information on the image compositor 131.

Here, since a time where the composition of the first composed image frame is completed in the image compositor 131, is not past a second update time RPT2, the image output 135 outputs the first composed image frame to the display unit 140 at the second update time RPT2. The first composed image frame is output for a first period FP1 of the frame update period FP. Further, the image output 135 transmits operation information including the frame update period FP of 33.3 ms and/or an output time value of the first composed image frame, that is, a value of the second update time RPT2, of 33.3 ms to the controller 170.

The display unit 140 displays the first composed image frame output from the image output 135 on the screen. Here, the first to third primary image frames are displayed in the respective split areas 141 on the screen of the display unit 140.

Meanwhile, the controller 170 calculates first optimal input time information on each of first to third secondary image frames to be subsequently input from the image processor 120 to the image compositor 131, based on the frame composition time CT of 27.7 ms and the frame update period FP of 33.3 ms or the time output value of the first composed image frame, that is, the value of the second update time RPT2, of 33.3 ms transmitted from the image compositor 131 and the image output 135, and provides the calculated first optimal input time information to the image processor 120.

Here, the first optimal input time information may include first to third primary input timing values to input the first to third secondary image frames from the image processor 120 to the image compositor 131 so that a second composed image frame of the first to third secondary image frames is output at an update starting time right after the first period FP1 of the frame update period FP in which composition of the second composed image frame starts, that is, at a third update time RPT 3. Here, when a sum of a time value of the first, second or third normal secondary input time IT1', IT2' or IT3' of the first to third secondary image frames and the first frame composition time CT1 exceeds a time value of the third update time RPT3, the first to third primary input timing values may be calculated as a negative value of the exceeded values. That is, the first primary input timing value is −1.1 ms as a sum of a time value of the first normal secondary input time IT1' and the first frame composition time CT1, which is 67.7 (40 ms+27.7 ms), exceeds a time value of the third update time RPT3 of 66.6 ms by 1.1 ms. The second and third primary input timing values are 0 ms as a sum of a time value of the second secondary input time IT2' and the first frame composition time CT1, which is 61 (33.3 ms+27.7 ms), and a sum of a time value of the third secondary input time IT3' and the first frame composition time CT1, which is 44.3 (16.6 ms+27.7 ms), do not exceed a time value of the third update time RPT3 of 66.6 ms.

The image processor 120 calculates first to third corrected secondary input times IT1a, IT2' and IT3' with respect to the first to third secondary image frames based on the first to third primary input timing values provided by the controller 170, and outputs the first to third secondary image frames with respect to the first to third image contents to the image compositor 131 at the first to third corrected secondary input times IT1a, IT2' and IT3', respectively. Here, the first corrected secondary input time IT1a of the first secondary image frame finally input is 38.9 ms, which is 1.1 ms shorter than the first normal secondary input time IT1'. The second and third corrected secondary input times IT2' and IT3' are 33.3 ms and 16.6 ms, respectively, which are the same as the second and third normal secondary input times IT2' and IT3', since the second and third input timing values are 0.

As such, when the first to third secondary image frames are output at the first to third corrected secondary input times IT1a, IT2' and IT3', the image compositor 131 composes the first to third secondary image frames for a second frame composition time CT2 of 27.7 ms, and outputs a second composed image frame to the image output 135. Here, since the first corrected secondary input time IT1a of the first secondary image frame finally input is 1.1 ms shorter than the first normal secondary input times IT1', the image compositor 131 finishes composing the second composed image frame before the third update time RPT3.

Likewise in composing the first composed image frame, the image compositor 131 transmits the second frame composition time CT2 taken to compose the first to third secondary image frames to the controller 170.

The image output 135 outputs the second composed image frame input from the image compositor 131 to the display unit 140 at the third update time RPT3. Here, the second composed image frame is output for a second period FP2 of the frame update period FP.

Further, the image output 135 transmits a frame update period FP of 33.3 ms and/or and a output time value of the second composed image frame, that is, a time value of the third update time RPT3, of 66.6 ms to the controller 170 as operation information.

The display unit 140 displays the second composed image frame output from the image output 135 on the screen. Here, the first to third secondary image frames are displayed in the respective split areas 141 on the screen of the display unit 140.

Figure 3B:
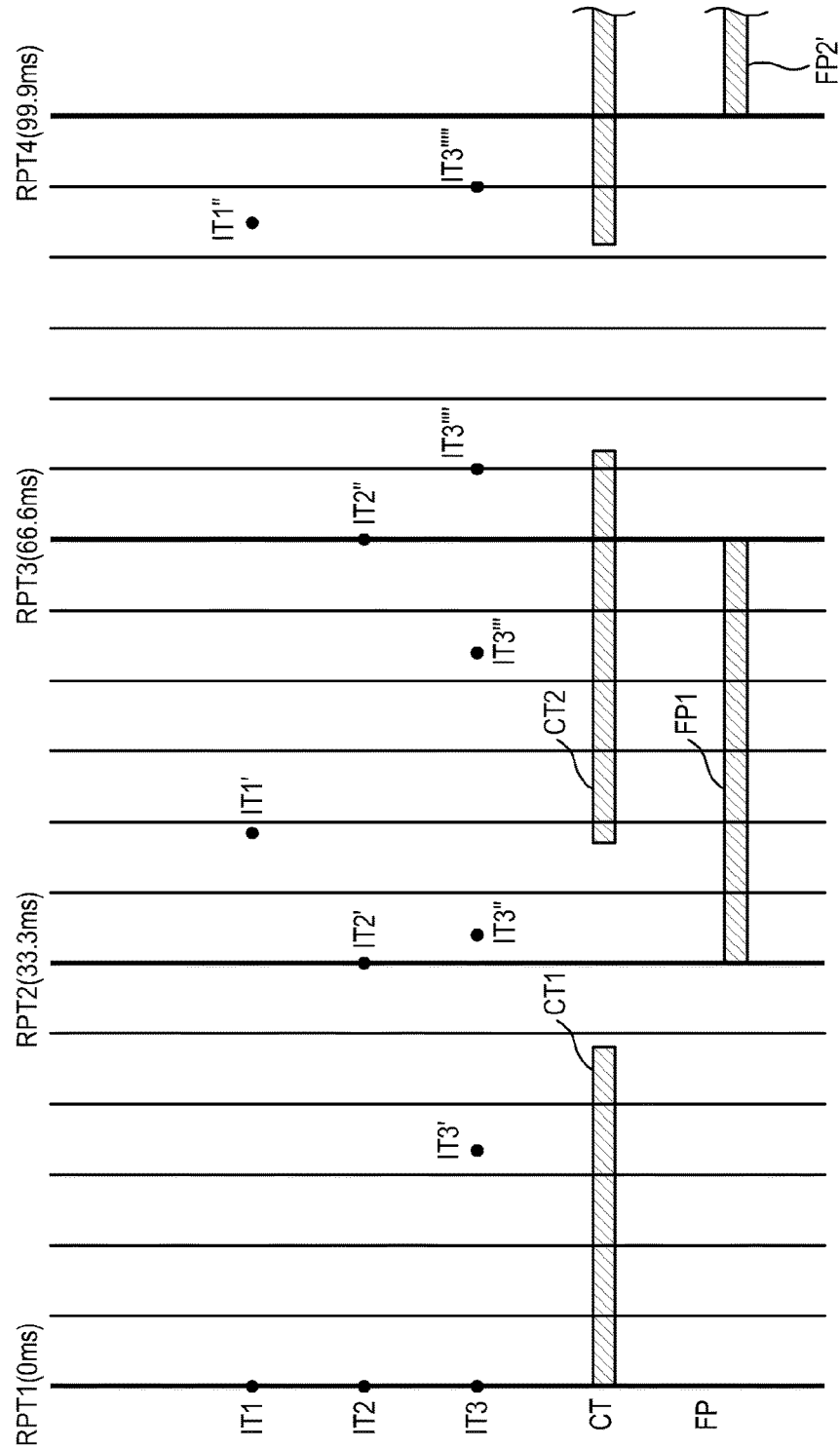
FIG. 3B illustrates input and output timings of image frames and a composed image frame of a conventional multi image reproducing apparatus to compare with the input and output timings of the image frames and the composed image frame of the multi image reproducing apparatus as shown in FIG. 3A.

Meanwhile, in a conventional art as shown in FIG. 3B, the first to third secondary image frames are input to the image compositor 131 at the first to third normal secondary input times IT1', IT2' and IT3', respectively. In this case, since the image compositor 131 starts composing the first to third secondary image frames based on the first normal secondary input time IT1' of the first secondary image frame finally input, if the first to third secondary image frames are composed for a second frame composition time CT2' of 27.7 ms, composition is finished at 67.7 ms after the third update time RPT3. As a result, the second composed image frame is output to the image output 135 at a fourth update time RPT4. Thus, the second and third secondary image frames having a frame update period which is the same as or shorter than the frame update period FP of the image output 135 are not output at the third update time RPT3 due to the first secondary image frame but are output to the image output 135 one period later, that is, after 33.3 ms, at the fourth update time RPT4 for a second period FP2' of the frame update period FP. As the second composed image frame is output to the image output 135 at the fourth update time RPT4, the image output 135 outputs the second composed image frame to the display unit 140 at the fourth update time RPT4. As a result, the second and third secondary image frames are displayed on the display unit 140 not at the third update time RPT 3 as an ideal output time allowed by the multi image reproducing apparatus 100 but at the fourth update time RPT4 for the second period FP2' of the frame update period FP. As the second and third secondary image frames are displayed after the third update time RPT3, the second image frame has a frame update period which is the same as or ½ shorter than the frame update period FP of the image output 135 and thus is displayed after missing one period at a proper frame update period of corresponding content as compared with the present embodiment. Thus, as compared with the split areas 141 on the screen of the display unit 140 of the present embodiment which display the second and third image frames at least in each frame update period (FP) of the image output 135, split areas on a screen of a conventional display unit that display the second and third image frames after missing one period at the proper frame update period of each corresponding content provide discontinuous images to a user, instead of smooth images. When this phenomenon frequently occurs, quality of images displayed on the display unit may be deteriorated overall.

Subsequently, third to Nth composed image frames are displayed on the display unit 140 based on first to third corrected tertiary to Nth-order input times IT1a', IT2'' and IT3'' with respect to the first to third tertiary to Nth-order image frames calculated in the same manner described above.

Although the multi image reproducing apparatus 100 according to the present embodiment has been described as using both the information on the frame composition time CT of the image compositor 131 and the information on the frame update period FP or information on the output time of the composed image frame as the operation information on the image composition and output part for calculating optimal input time information on each image frame to be input from the image processor 120 to the image compositor 131, the present embodiment is not limited thereto. That is, optimal input time information on image frames may be calculated using one of the operation information on the image compositor 131 and the image output 135, for example, the information on the frame composition time CT of the image compositor 131, or the information on the frame update period FP or the information on the output time of the composed image frame. When the information on the frame composition time CT of the image compositor 131 is only used, the controller 170 may calculate optimal input time information on image frames so that a finally input image frame is input earlier by the frame composition time CT. When the information on the frame update period FP or the information on the output time of the composed image frame is used, the controller 170 may calculate optimal input time information on image frames so that a finally input image frame and/or all image frames are input earlier at a start point of the frame update period FP.

Hereinafter, a multi image reproducing method of the multi image reproducing apparatus 100 according to an exemplary embodiment will be described with reference to FIGS. 3A and 4.

First, when a plurality of image contents is input from a plurality of external image sources, the content receptor 110 separates each of the image contents into image data and audio data, and outputs the image data to the image processor (S100). Here, only audio data corresponding to image content selected based on a user input through the user input 150 may be processed among the audio data corresponding to the image contents and be output to the speaker SPK.

Next, the image processor 120 processes a plurality of image data corresponding to the plurality of image contents and outputs the image data by the image contents to the image compositor 135 (S110). Here, the image processor 120 outputs the plurality of image data by frame units according to frame rates of the corresponding image contents.

The image compositor 131 composes primary image frames input from the image processor 120 at first input times IT1, IT2 and IT3 into one image frame during a first frame composition time CT1, and outputs the first composed image frame to the image output 135. Simultaneously, the image compositor 131 transmits information on the first frame composition time CT taken to compose the primary image frames to the controller 170 as operation information on an operation of the image compositor 131 (S120). Here, the first composed image frame is formed such that the primary image frames are displayed in the respective split areas 141 forming a multi image on the screen of the display unit 140.

The image output 135 outputs the first composed image frame input from the image compositor 135 to the display unit 140 during a first period FP1 of a predetermined frame update period FP to be displayed on the display unit 140 and also transmits information on a frame update period (FT) or information on an output time value of the first composed image frame, that is, the time value of the second update time RPT2, to the controller 170 as operation information on an operation of the image output 135 (S130). Here, the display unit 140 displays the first composed image frame output from the image output 135 on the screen.

As described above in FIG. 3A, the controller 170 calculates first optimal input time information on each of secondary image frames to be subsequently input from the image processor 120 to the image compositor 131 based on the information on the frame composition time CT as the operation information on the image compositor 131 received from the image compositor 131 and the information on the frame update period FT or information on the time value of the output time of the first composed image frame, that is, the time value of the second update time RPT2, as the operation information on the image output 135 received from the image output 135, and transmits the first optimal input time information on each of the secondary image frames to the image processor 120 (S140).

The image processor 120 calculates corrected secondary input times IT1a, TI2' and IT3' for the secondary image frames based on the first optimal input time information on the secondary image frames received from the controller 170, and outputs the secondary image frames to the image compositor 131 at the corrected secondary input times It1a, IT2' and IT3' (S150).

When the secondary image frames are output at the corrected secondary input times IT1a, IT2' and IT3', the image compositor 131 and the image output 135 compose a second composed frame in the same manner as described above in S120 to S150 and output the second composed frame to the display unit 140 (S160).

Subsequently, third to Nth composed image frames are displayed on the display unit 140 based on third corrected tertiary to Nth-order input times IT1a', IT2" and IT3" with respect to first to third tertiary to Nth-order image frames calculated in the same manner as described above in S120 to S150 (S170).

As described above, in the multi image reproducing apparatus 100 and the multi image reproducing method according to the exemplary embodiments, the controller 170 calculates optimal input time information on each of image frames to be subsequently input from the image processor 120 to the image compositor 131 based on information on a frame composition time CT and information on a frame update period FP or time values of output times of first and second composed image frames, that is, second and third update times RPT2 and RPT3, respectively transmitted from the image compositor 131 and the image output 135, and provides the calculated optimal input time information to the image processor 120. Then, the image processor 120 calculates corrected input times IT1a, IT2', IT3; IT1 a', IT2", IT3'" for the image frames based on the optimal input time information for quickest output of the image frames provided from the controller 170 to the display unit 140 and outputs the image frames of each image content to the image compositor 131 at the corrected input times IT1a, IT2', IT3; IT1a', IT2", IT3'". As a result, a composed image frame by the image compositor 131 may be output to the image output 135 without missing an ideal output time that is an update starting time right after an interval of the frame update period FP in which composition starts, for example, the third update time RPT3 right after the second period FT1, and be displayed on the display unit 140. Accordingly, the image frames may be displayed in the split areas 141 on the screen of the display unit 140 in each frame update period FP of the image output 135. Thus, smooth images may be provided to users as compared with the conventional art in which some frames are displayed on part of the screen of the display, missing a period at the properframe update period of corresponding content, thereby improving quality of images displayed on the display unit 140 overall.

Although a few exemplary embodiments have been shown and described, it will be appreciated by those skilled in the art that changes may be made in these exemplary embodiments without departing from the principles and spirit of the embodiments, the scope of which is defined in the appended claims and their equivalents.\

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the encoding apparatus and decoding apparatus described herein.

What is claimed is:

1. A multi image reproducing apparatus, comprising:
a plurality of image processors configured to process and output a plurality of image frames corresponding to a plurality of image contents, respectively;
an image composition and outputer configured to generate a composed image frame of the plurality of image frames from the plurality of image processors and to output the composed image frame according to a corresponding frame update period;
a display configured to display the composed image frame; and
a controller configured;
to obtain operation information from the image composition and outputer; and
to control the plurality of image processors to output the plurality of image frames based on the operation information, so that the composed image frame is output within the corresponding frame update period in which the composed image frame is displayed.

2. The multi image reproducing apparatus of claim 1, wherein the image composition and outputer comprises:
an image compositor configured to compose the image frames input from the plurality of image processors into one split image frame; and
an image output configured to output the one split image frame composed by the image compositor in a predetermined frame update period.

3. The multi image reproducing apparatus of claim 2, wherein the operation information comprises at least one of first information about an operation of the image compositor provided by the image compositor and second information about an operation of the image output provided by the image output.

4. The multi image reproducing apparatus of claim 3, wherein the first information comprises information about a frame composition time which is a time taken to compose the image frames by the image compositor.

5. The multi image reproducing apparatus of claim 3, wherein the second information comprises one of information about a frame update period of the image output and information about an output time of the composed image frame.

6. The multi image reproducing apparatus of claim 2, wherein the optimal output time information of the image frames comprises input timing values to input the image frames from the plurality of image processors to the image compositor to output a composed image frame of the image frames is output at an update time right after an interval of the frame update period in which composition starts.

7. The multi image reproducing apparatus of claim 6, wherein when a sum of a time value of a normal input time of the image frames to the image compositor and a frame composition time exceeds a time value of the update time, the input timing values are calculated as a negative value of an exceeded time value.

8. The multi image reproducing apparatus of claim 1, wherein the plurality of image processors are configured to calculate corrected input times of respective image frames based on an optimal input time information of the image frames input from the plurality of image processors to the image composition and outputer, provided from the controller and to input the respective image frames according to the corrected input times.

9. The multi image reproducing apparatus of claim 1, wherein the controller is configured to control timing of the plurality of image frames output by the plurality of image processors based on the operation information.

10. A multi image reproducing method, comprising:
   outputting a plurality of image frames corresponding to a plurality of image contents, respectively;
   generating a composed image frame of the plurality of image frames of the outputting to output the composed image frame according to a corresponding frame update period;
   displaying the composed image frame;
   obtaining operation information; and
   controlling the plurality of image processors to output the plurality of image frames based on the operation information, so that the composed image frame is output within the corresponding frame update period in which the composed image frame is displayed on the outputting.

11. The multi image reproducing method of claim 10, wherein the composing comprises:
   composing the input image frames into one mosaic image frame; and
   outputting a composed mosaic image frame in a predetermined frame update period.

12. The multi image reproducing method of claim 11, wherein the operation information comprises at least one of first information about an operation of composing the image frames and second information about an operation of the outputting the composed mosaic image frame.

13. The multi image reproducing method of claim 12, wherein the first information comprises information about a frame composition time taken to compose the image frames.

14. The multi image reproducing method of claim 12, wherein the second information comprises one of information about a frame update period and information about an output time of the composed mosaic image frame.

15. The multi image reproducing method of claim 10, wherein the controlling comprises:
   calculating optimal input time information of the image frames to compose the image frames based on the operation information about the composing;
   calculating respective corrected input times of the image frames based on the calculated optimal input time information of the image frames; and
   inputting the respective image frames to compose the image frames based on the respective corrected input times of the image frames.

16. The multi image reproducing method of claim 15, wherein the calculating optimal input time information of the image frames further comprises calculating input timing values to input the image frames to output a composed image frame of the image frames at an update time right after an interval of the frame update period in which composition starts.

17. The multi image reproducing method of claim 16, wherein when a sum of a time value of normal input time of the image frames and a frame composition time exceeds a time value of the update time, the input timing values are calculated as a negative value of an exceeded time value.

18. The multi image reproducing method of claim 10, wherein the controlling comprises controlling timing of the plurality of image frames output by the plurality of image processors based on the operation information.

* * * * *